United States Patent [19]
Kolev et al.

[11] Patent Number: 6,125,283
[45] Date of Patent: Sep. 26, 2000

[54] MULTI-MODE MOBILE TERMINAL AND METHODS FOR OPERATING THE SAME

[75] Inventors: Javor Kolev, Cary; Carsten Hoirup, Raleigh; Brett Pantalone, Willow Spring; Anthony J. Swanchara, III, Apex, all of N.C.

[73] Assignee: Ericsson Inc., Research Triangle Park, N.C.

[21] Appl. No.: 09/081,162

[22] Filed: May 18, 1998

[51] Int. Cl.[7] ........................................................ H04B 1/40
[52] U.S. Cl. ........................ 455/552; 455/553; 455/558; 455/527; 455/432; 455/435
[58] Field of Search ..................... 455/404, 432, 455/403, 521, 525, 527, 528, 552, 565, 575, 553, 558, 550, 186.1, 435

[56] References Cited

U.S. PATENT DOCUMENTS

| | | | |
|---|---|---|---|
| 5,864,755 | 1/1999 | King et al. ............................. | 455/404 |
| 5,884,168 | 3/1999 | Kolev et al. ........................... | 455/432 |
| 5,890,061 | 3/1999 | Timm et al. ........................... | 455/404 |
| 5,946,634 | 8/1999 | Korpela ................................. | 455/552 |

FOREIGN PATENT DOCUMENTS

| | | |
|---|---|---|
| WO92/16077 | 9/1992 | WIPO . |
| WO97/07642 | 2/1997 | WIPO . |

OTHER PUBLICATIONS

International Search Report dated Jul. 30, 1999.
Excerpt from *Asia Cellular Satellite System SAIS: Mobile Radio Interface Layer 3* Specification; Mar. 1997, SAIS 4.08.
Excerpt from *European Telecommunications Standard*; European Digital Cellular Telecommunications System (Phase 2); Functions Related to Mobile Station (MS) in Idle Mode; May, 1995.

*Primary Examiner*—William G. Trost
*Assistant Examiner*—Temica M. Davis
*Attorney, Agent, or Firm*—Myers Bigel Sibley & Sajovec

[57] ABSTRACT

A multi-mode mobile terminal having a subscriber identity is provided which uses knowledge of communications network supported service levels to navigate to a communication mode allowing the greatest possible service availability when the subscriber identity in at least one of the network modes is invalid. The mobile terminal may not only provide the ability to switch communication service from a current mode to an alternative mode to process emergency calls but may also restrict user operations on a communications network based on the services available without a valid subscriber identity. Operations of the mobile terminal invention may be supported by service level information on various communication service providers contained in memory within the mobile terminal or be obtained by the mobile terminal from the networks. Based on services availability information for each communications network available to the mobile terminal, the mobile terminal selects an appropriate network to utilize for a call initiated while the mobile terminal has no valid subscriber identification. An example of such a call would be an emergency call such as a 911 call.

20 Claims, 7 Drawing Sheets

MULTI-MODE MOBILE TERMINAL AND METHODS FOR OPERATING THE SAME

FIELD OF THE INVENTION

This invention relates to communication systems and more particularly to multi-mode mobile terminals operating with two or more wireless communications networks.

BACKGROUND OF THE INVENTION

Public cellular networks (public land mobile networks) are commonly employed to provide voice and data communications to a plurality of subscribers. For example, analog cellular radiotelephone systems, such as designated AMPS, ETACS, NMT-450, and NMT-900, have been deployed successfully throughout the world. More recently, digital cellular radiotelephone systems such as that designated as IS-54B (and its successor IS-136) in North America and the pan-European GSM system have been introduced. These systems, and others, are described, for example, in the book titled *Cellular Radio Systems* by Balston, et al., published by Artech House, Norwood, Mass., 1993. In addition, satellite based radio communication systems are also being utilized to provide wireless communications in various regions such as the Asian Cellular Satellite System (ACeS) generated by Lockheed Martin Corporation. Furthermore, dual-mode mobile terminals are known which allow a single terminal to access to different networks. For example, an analog/digital dual-mode terminal or a terrestrial/satellite dual-mode terminal may be desirable in various geographic areas to maximize the communications capabilities available to a user.

Figure 1:
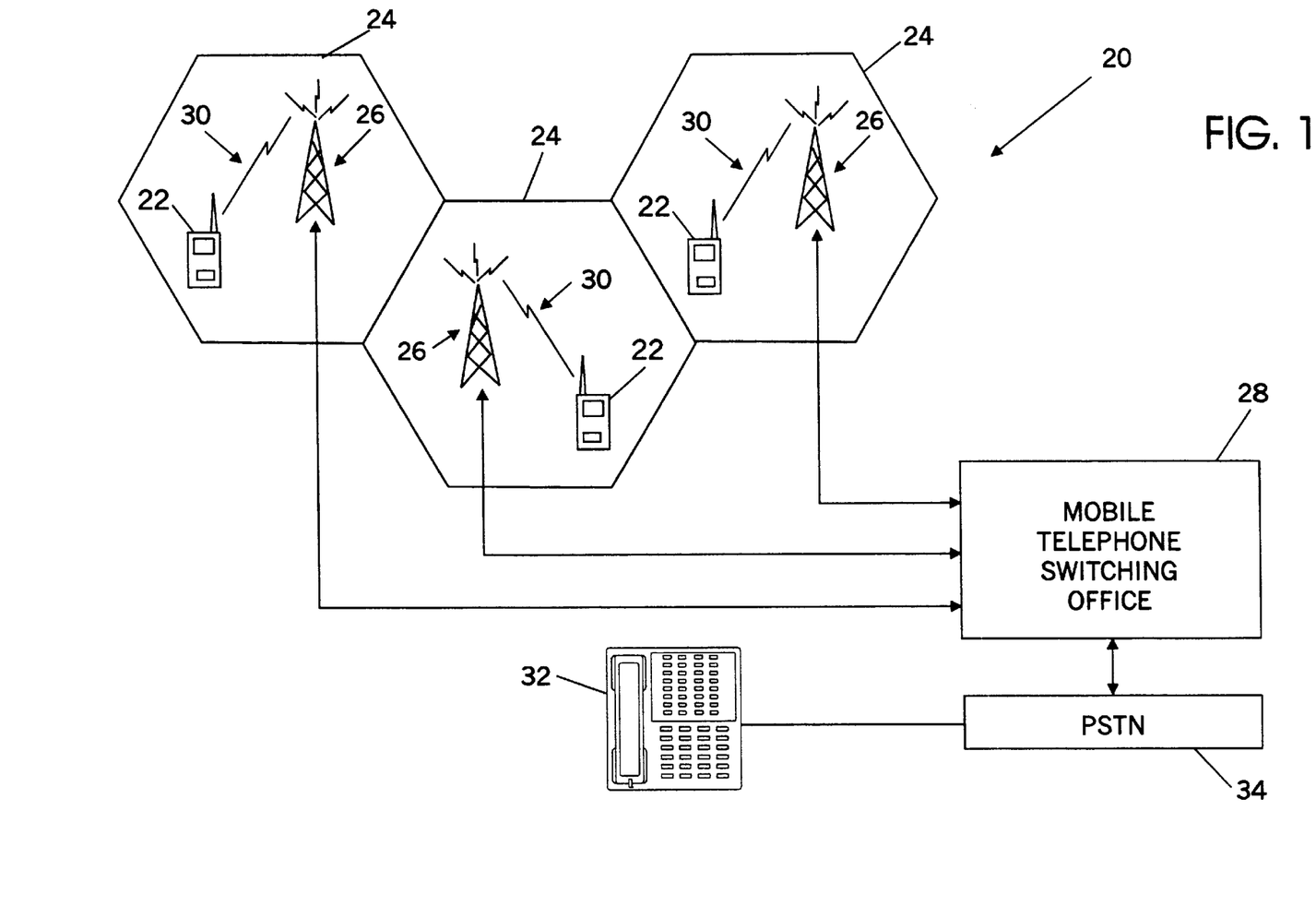
FIG. 1 schematically illustrates a portion of a wide area cellular network including a plurality of base stations servicing different geographic areas.

FIG. 1 illustrates a conventional terrestrial wireless communication system 20 that may implement one of the aforementioned wireless communication standards. The wireless system may include one or more wireless mobile terminals 22 that communicate with a plurality of cells 24 served by base stations 26 and a mobile telephone switching office (MTSO) 28. Although only three cells 24 are shown in FIG. 1, a typical cellular radiotelephone network may comprise hundreds of cells, and may include more than one MTSO 28 and may serve thousands of wireless mobile terminals 22.

The cells 24 generally serve as nodes in the communication system 20, from which links are established between wireless mobile terminals 22 and a MTSO 28, by way of the base stations 26 servicing the cells 24. Each cell 24 will have allocated to it one or more dedicated control channels and one or more traffic channels. The control channel is a dedicated channel used for transmitting cell identification and paging information. The traffic channels carry the voice and data information. Through the communication system 20, a duplex radio communication link 30 may be effected between two wireless mobile terminals 22 or between a wireless mobile terminal 22 and a landline telephone user 32 via a public switched telephone network (PSTN) 34. The function of the base station 26 is commonly to handle the radio communications between the cell 24 and the wireless mobile terminal 22. In this capacity, the base station 26 functions chiefly as a relay station for data and voice signals.

Figure 2:
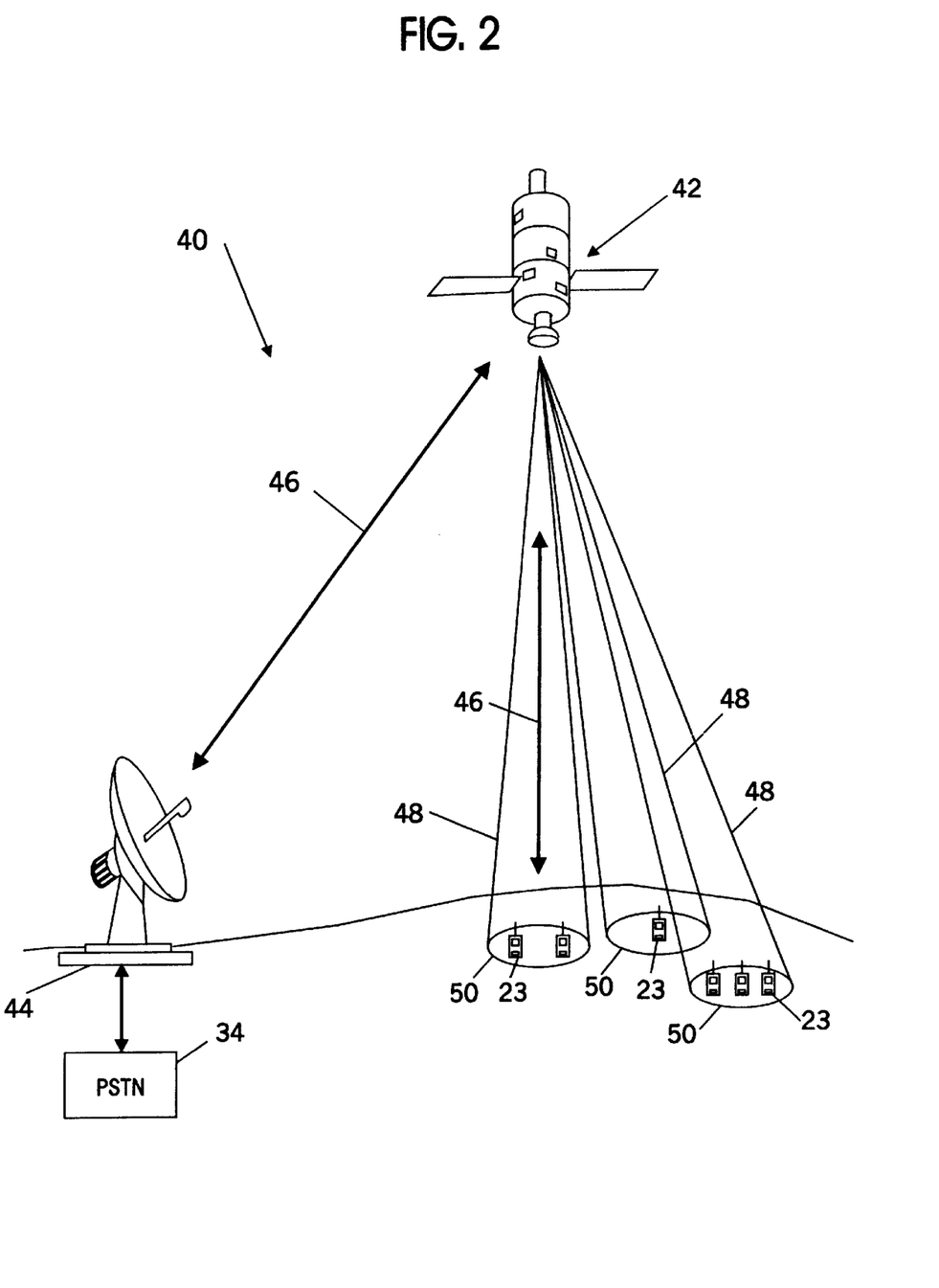
FIG. 2 schematically illustrates a portion of a satellite based wide area cellular network having spot beams covering different geographic areas.

FIG. 2 illustrates a conventional celestial wireless communication system 40. The celestial wireless communication system 40 may be employed to perform similar functions to those performed by the conventional terrestrial wireless communication system 20 of FIG. 1. In particular, the celestial wireless communication system 40 typically includes one or more satellites 42 that serve as relays or transponders between one or more earth stations 44 and satellite wireless mobile terminals 23. The satellite 42 communicates with the satellite wireless mobile terminals 23 and earth stations 44 via duplex communication links 46. Each earth station 44 may in turn be connected to a PSTN 34, allowing communications between the wireless mobile terminals 23 and conventional landline telephones 32 (FIG. 1).

The celestial wireless communication system 40 may utilize a single antenna beam covering the entire area served by the system, or as shown in FIG. 2, the celestial wireless communication system 40 may be designed such that it produces multiple, minimally-overlapping beams 48, each serving a distinct geographical coverage area 50 within the system's service region. A satellite 42 and coverage area 50 serve a function similar to that of a base station 26 and cell 24, respectively, of the terrestrial wireless communication system 20.

Thus, the celestial wireless communication system 40 may be employed to perform similar functions to those performed by conventional terrestrial wireless communication systems. In particular, a celestial radiotelephone communication system 40 has particular application in areas where the population is sparsely distributed over a large geographic area or where rugged topography tends to make conventional landline telephone or terrestrial wireless infrastructure technically or economically impractical.

Control over access to these various communication networks is typically provided by some form of user (subscriber) identification. In the earliest analog systems, such as the AMPS system, a subscriber identity verification is typically not required and charging for services is generally based upon the assigned phone number of the analog mobile terminal. With the introduction of digital and satellite based systems, a greater range of communication service options are typically made available to a user (subscriber) of a communication network such as paging and short message service. Accordingly, these networks typically require a subscriber identity verification from a mobile terminal attempting to access the network at the level authorized for the user's subscriber identity. For example, in the GSM system, a Subscriber Identity Module (SIM) is typically provided to a mobile terminal and provides subscriber identity which the terminal provides to the communication network provider to obtain access to the network. The network may then verify that the provided identification is valid before allowing access to the mobile terminal.

Access without a valid subscriber identification may vary across communication networks. For example, GSM allows emergency calls while ACeS allows no access. For normal operations, GSM-based digital systems typically require that a SIM card with a valid subscriber identity is present in the terminal when the mobile terminal is switched on. This subscriber identity may be verified on network request during mobile terminal network accesses and approved or rejected as a result of this process. Any SIM present in the phone when a verification process fails is typically considered invalid until the mobile terminal is switched off or the SIM card is replaced. If no valid SIM card is available at power on, or if the SIM card is removed or invalidated, systems typically provide only limited user service such as emergency calling. Other systems do not even provide emergency call access without a valid SIM.

A problem with dual-mode mobile terminals occurs where a subscriber identification is lost. The assigned identification may be lost due to failure to pay or other act by the subscriber or due to communication errors during an exchange of identification information with a communication network. Where access to one network is affected, the mobile terminal's protocols for selecting an operating mode may be less than optimal for user performance.

SUMMARY OF THE INVENTION

It is, therefore, an objective of the present invention to resolve the problem of multi-mode mobile terminal service selection protocols where a subscriber identification has been determined to be invalid.

It is a further objective of the present invention to provide mobile terminals and methods of operating the same which will attempt to provide emergency telephone services regardless of whether the mobile terminal has a valid subscriber identification.

These and other objects are provided, according to the invention, by providing a multi-mode mobile terminal having a subscriber identity which uses knowledge of communication network supported service levels to navigate to a communication mode allowing the greatest possible service availability when the subscriber identity is invalid. The mobile terminal of the present invention may not only provide the ability to switch communication service from a current mode (network) to an alternative mode to process emergency calls but may also restrict user operations on a communication network based on the services available without a valid subscriber identity. Operations of the mobile terminal of the present invention may be supported by service level information on various communication networks contained in memory within the mobile terminal or be obtained by the mobile terminal from the networks. Based on services availability information for each communication network available to the mobile terminal, the mobile terminal selects an appropriate network to utilize for a call initiated while the mobile terminal has no valid subscriber identification. An example of such a call would be an emergency call such as a 911 call.

In particular, a multi-mode mobile terminal having a subscriber identity is provided according to a first aspect of the present invention. The mobile terminal includes a transceiver means for communicating over a first and a second wireless communication network. The terminal further includes means for determining if the first network allows access without a valid subscriber identity and if the second network allows access without a valid subscriber identity. In addition, the mobile terminal includes a means for determining if the subscriber identity of the mobile terminal is valid for the first network or the second network. Finally, the mobile terminal includes means for controlling the transceiver means so as to communicate over a select one of the first or the second network which allows access without a valid subscriber identity if the subscriber identity of the mobile terminal is invalid in both the first network and the second network.

In a further aspect of the mobile terminal of the present invention, the mobile terminal includes a display means for notifying a user that the subscriber identity is invalid. The terminal further includes an input means for receiving input from the user specifying one of said first or second networks to use for communications. The means for controlling the transceiver in this embodiment further includes means for controlling the transceiver means so as to communicate over a user specified one of the first or second networks.

The mobile terminal of the present invention may be utilized in an environment in which the first network is a satellite network and the second network is a terrestrial network. The satellite network may be an Asian Cellular Satellite System. Alternatively, the first network may be a digital network and the second network may be an analog network such as an AMPS network allowing access to users without a valid satellite subscriber identity. Both the first network and the second network may be terrestrial networks or they may both be satellite networks. The digital network may be the Asian Cellular Satellite System. The digital network may also be a terrestrial network allowing only emergency call access without a valid subscriber identity. The means for controlling the transceiver may include means for controlling the transceiver means so as to communicate over an AMPS network when an AMPS network is one of the available networks so as to provide the mobile terminal the broadest communication service available without a valid subscriber identity.

In a further embodiment of the present invention, the mobile terminal may include a subscriber identity module containing the subscriber identity of the mobile terminal. The terminal may further include a storage means which contains a definition of communication services available from the first and second network without a valid subscriber identity.

In a further aspect of the mobile terminal of the present invention, the terminal includes means for preventing operation of the transceiver means for communicating over one of the first network or the second network which does not allow access without a valid subscriber identity unless the mobile terminal has a valid subscriber identity for the one of the first network or the second network which does not allow access without a valid subscriber identity. Alternatively, means may also be included for preventing user access to non-emergency communication services requiring a valid subscriber identity when the mobile terminal is communicating without a valid subscriber identity.

In a method aspect of the present invention, a method is provided for dual-mode operation of a mobile terminal in a first communications network which allows access without a valid subscriber identity and a second communications network which requires a valid subscriber identity for access. The mobile terminal determines if the subscriber identity of the mobile terminal is valid. The mobile terminal then selects operations in the first communications network when the subscriber identity is determined to be invalid. The selecting step in one embodiment includes the steps of overriding pre-stored network selection criteria while the subscriber identity is determined to be invalid and automatically switching operations from the second communications network to the first communications network in response to a determination that the subscriber identity of the mobile terminal is invalid. In a further aspect of the methods of the present invention, user notification of an invalid subscriber identity is provided and user confirmation of a switch from the second communications network to the first communications network is received before switching communication operations. The determining step may be initiated responsive to a user initiated emergency call. User access to communication services requiring a valid subscriber identity may be prevented while a subscriber identity is determined to be invalid.

Accordingly, the present invention provides apparatus and methods allowing operation of a multi-mode terminal with access to multiple communication networks which may provide best available communication services when the mobile terminal lacks a valid subscriber identity. The present invention thereby may provide the highest level of access available and opportunity for placement of important user calls, such as emergency calls, even when a valid subscriber identity is not available to the mobile terminal.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods or devices. Accordingly, the present invention may take the form of a hardware embodiment, a software embodiment or an embodiment combining software and hardware aspects.

Figure 3:
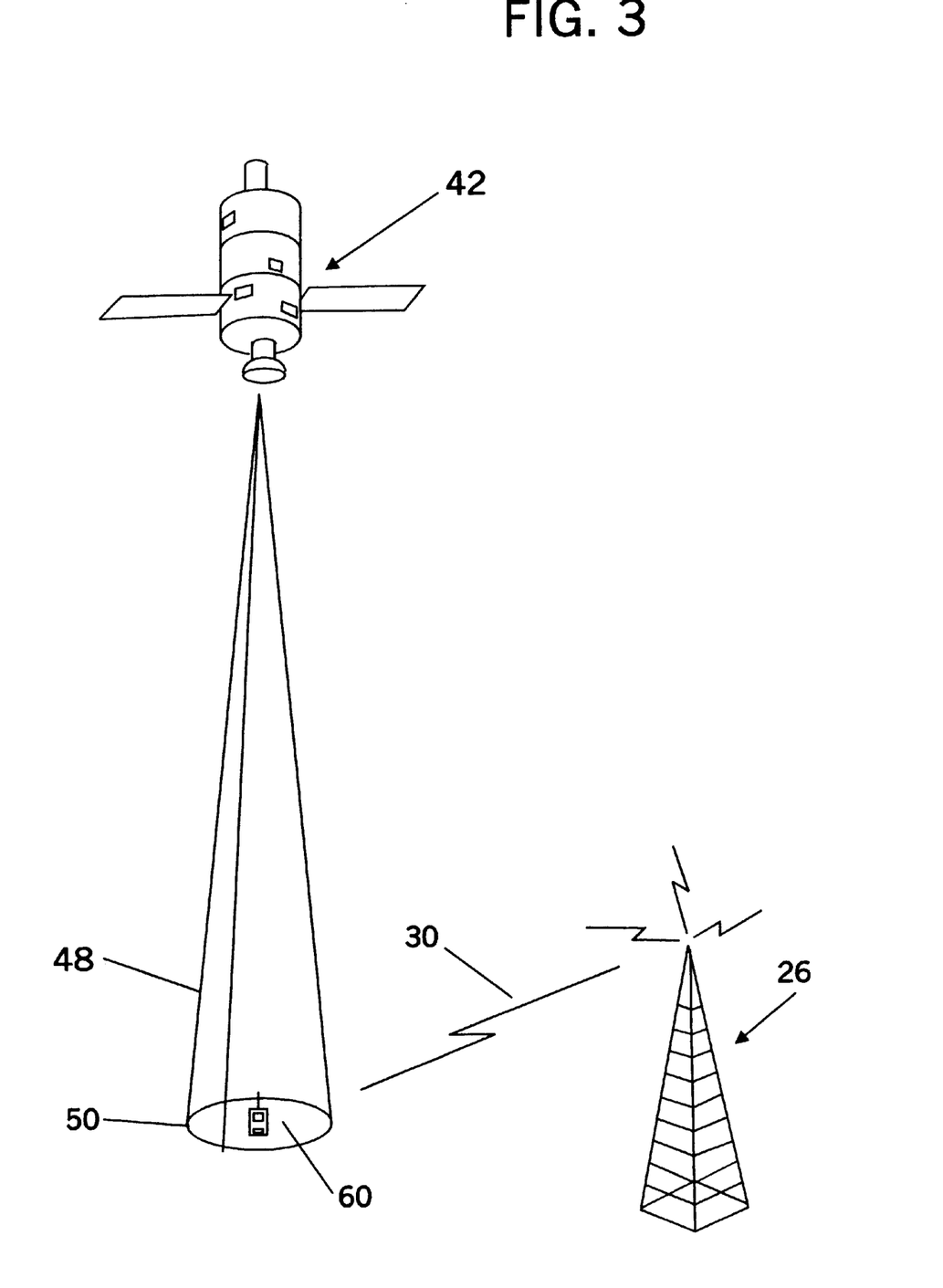
FIG. 3 schematically illustrates the operating environment of the present invention where one of the available networks is a satellite based network and the other of the available networks is a terrestrial network.

FIG. 3 illustrates the operating environment of a dual-mode mobile terminal according to the present invention. Satellite 42 projects spot beam 48 onto geographic region 50 to provide communications service to the user terminal 60 from a first wireless communication network 40. The beam 48 broadcasts system information on a control channel using frequency $f_c$. The system information may include an identification of the communication network and other control information. The system information enables the user terminal to register with the system by identifying the serving beam. While one spot beam is illustrated, the satellite may project a plurality of spot beams to provide service to a plurality of geographic regions as illustrated in FIG. 2.

The terrestrial communications base station 26 may be a part of terrestrial cellular network 20 which provides service to a portion of the geographic region 50. In particular, the cellular network may broadcast system information over a control channel wherein the system information includes an identification of the communication network or other control information. For example, the terrestrial communications network 20 may be an AMPS cellular radiotelephone system or a GSM cellular radiotelephone. Although specific examples of the terrestrial communications system are given above, it should be understood that other systems which provide analogous information are within the scope of the present invention.

Operations of the present invention will be described primarily herein with reference to dual-mode mobile terminals which will operate in a satellite system such as the Asia Cellular Satellite System and in either the GSM or the AMPS terrestrial systems. However, the benefits of the present invention may also be realized with mobile terminals which operate in digital terrestrial systems such as GSM 1900 and in AMPS. The invention may also be applied to any kind of multi-mode mobile terminal operating under no-valid-SIM-conditions in a system environment with different levels of system-supported service on the different available communication networks. The invention will further be described primarily with reference to a dual-mode mobile terminal which includes a subscriber identity module containing the subscriber identity information such as are known in GSM digital terrestrial communications systems. However, the benefits of the present invention are not limited to such terminals and may be obtained with any multi-mode terminal having a means for associating a subscriber identity with a mobile terminal.

Figure 4:
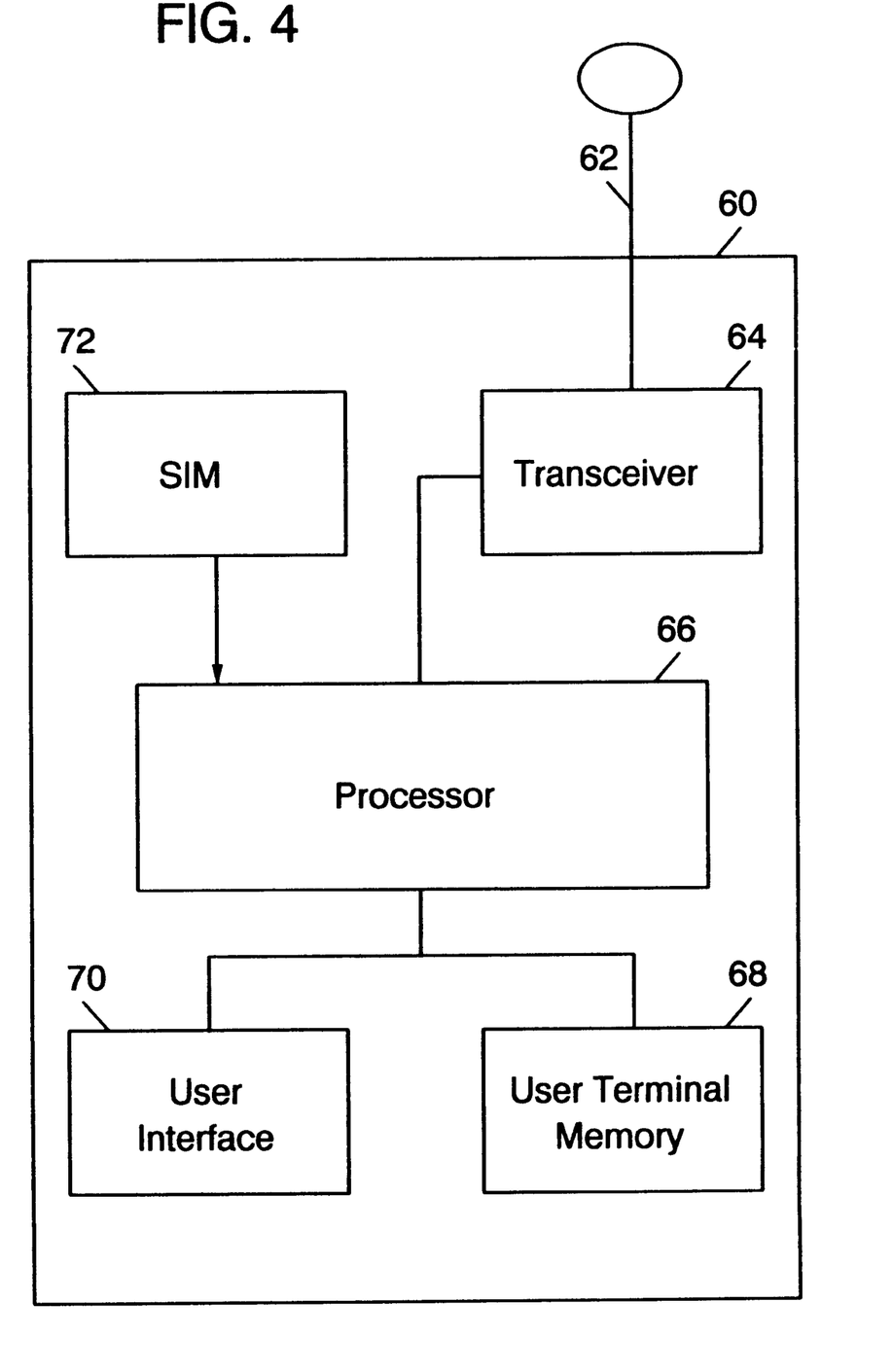
FIG. 4 is a block diagram of a dual-mode mobile terminal according to an embodiment of the present invention.

Referring now to the embodiment illustrated in FIG. 4, the user terminal 60 is a radiotelephone, such as a dual-mode radiotelephone, capable of communicating with the satellite communications system 40 and the terrestrial communications system 20. The user terminal 60 may operate as a satellite radiotelephone or the user terminal 60 may switch between satellite and terrestrial modes under user control or automatically. The user terminal 60 includes an antenna 62 and transceiver 64 or other transceiver means for transmitting and receiving communications to/from the satellite network and/or the terrestrial network. The processor 66 accepts and provides information to and from the transceiver 64 and selects a control channel for the user terminal 60 to communicate with the satellite communication network 40 or terrestrial network 20. The user terminal memory 68 stores information related to the satellite communication network 40 and the terrestrial communication network 20. The user interface 70 may include a key pad by which the user may control the operation of the user terminal 60. User terminal 60 may also include a Subscriber Identification Module (SIM) 72 containing a subscriber identity which may be used to control access to the satellite communication network 40 and/or the terrestrial communications network 20.

Processor 66, according to the present invention, implements the no-valid-SIM operations according to the present invention. Processor 66 provides means for determining if the first network available to the mobile terminal allows access without a valid subscriber identity (or the level of service available) and means for determining if the second network available to the mobile terminal allows access with a valid subscriber identity (or the level of service available). As described previously, this means may be provided by processor 66 through access to communication network service level information pre-stored in memory 68 or obtained by processor 66 through communications with the first and second networks. In a simple case, the second network may be a satellite network such as AceS with no access and the first network may be a terrestrial network with some level of access and determining operations may simply require programming the mobile terminal to select the terrestrial network for no-valid-SIM operations as described herein.

As illustrated further in FIG. 4, processor 66 is also connected to SIM 72 and provides a means for determining if the subscriber identity from SIM 72 is valid for the first network or the second network. Processor 66 further provides means for controlling transceiver 64 so as to communicate over a selected one of the first or the second network which allows access without a valid subscriber identity if the subscriber identity of mobile terminal 60 is invalid in the first and the second network.

If the subscriber identity is valid in either of the first or second network, operations preferably continue through the network in which a valid identity exists as this will typically be expected to provide a higher level of service. It is the objective of the present invention to provide the highest level of service available.

User interface 70 provides both an input and output means. Interface 70, according to one embodiment of the present invention, includes display means for notifying a user that the subscriber identity is invalid. Interface 70 further includes an input means, such as a keyboard, for receiving input from the user specifying one of the first or second networks to be used for communications. Processor 66, in this embodiment, includes means for controlling the transceiver 64 so as to communicate over a user specified one of the first or second networks. Memory 68 preferably contains a definition of a level of communication services available from the first and the second network without a valid subscriber identity.

In the illustrated embodiment of FIG. 4, processor 66 further includes means for preventing operation of the transceiver 64 for communicating over one of the first network or the second network which does not allow access without a valid subscriber identity unless mobile terminal 60 has a valid subscriber identity for the one of the first network or the second network which does not allow access without a valid subscriber identity. Alternatively, processor 66 may include means for preventing user access to communications services on a communication network which require a valid subscriber identity when the mobile terminal is communicating without a valid subscriber identity. Accordingly, mobile terminal 60 may continue to allow user access to a communications network for some services but not for other services when no valid subscriber identity is available.

As will be appreciated by those of skill in this art, the above-described aspects of the present invention in FIG. 4 may be provided by hardware, software, or a combination of the above. While various components of mobile terminal 60 have been illustrated in FIG. 4, in part, as discrete elements, they may, in practice, be implemented by a microcontroller including input and output ports and running software code, by custom or hybrid chips, by discrete components or by a combination of the above. For example, memory 66 may be contained within processor 66.

Operations of the present invention will now be described with respect to FIGS. 5 and 6. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 5:
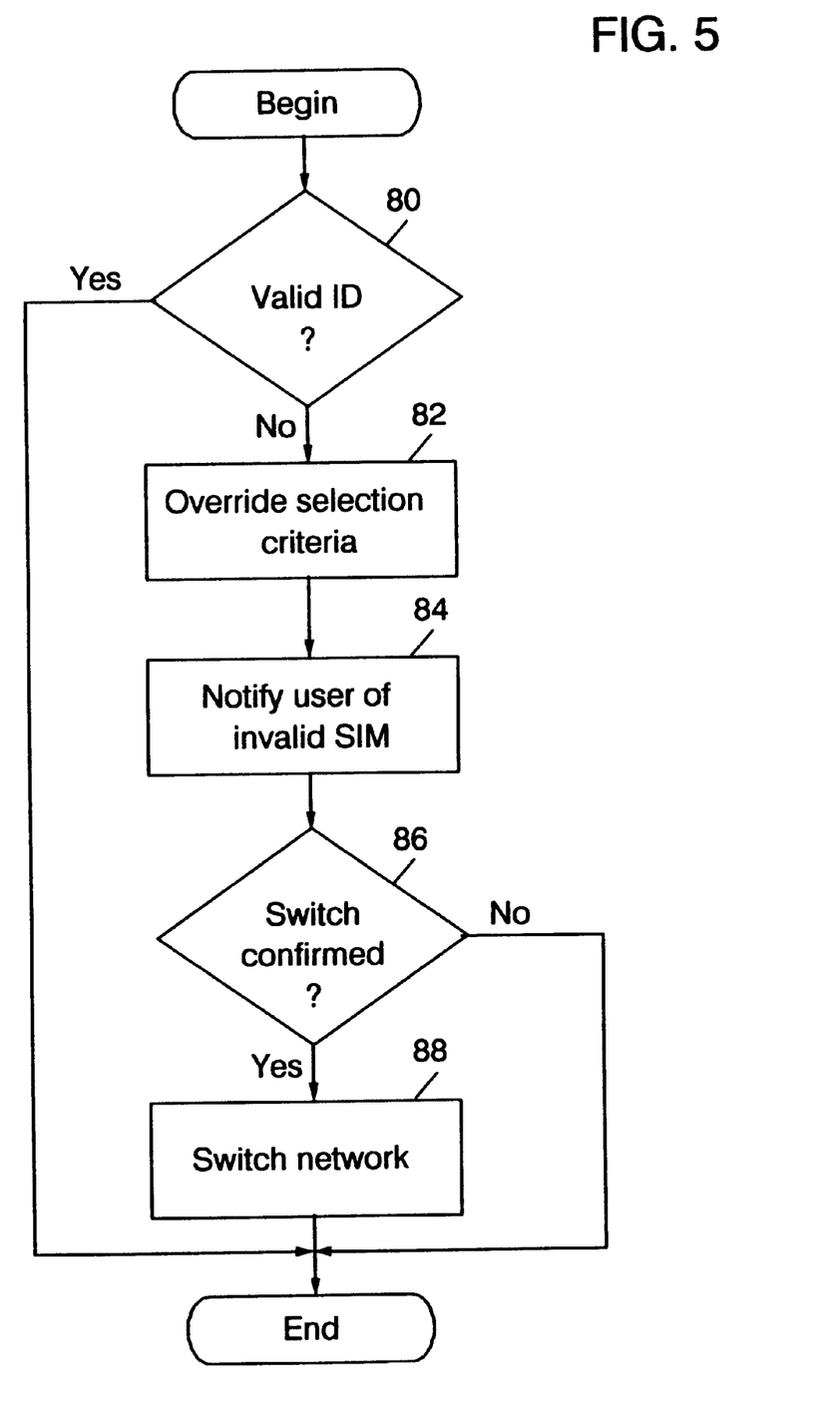
FIG. 5 is a flowchart illustrating operations for an embodiment of the present invention.

Referring now to FIG. 5, operations begin at block 80 with processor 66 determining if mobile terminal 60 has a valid subscriber identity. This check may be initiated at the time of power on or responsive to a request for placement of a call such as an emergency call by a user of the mobile terminal. At block 82, processor 66 overrides any pre-stored network selection criteria while the subscriber identity is determined to be invalid. At block 84, the user of the mobile terminal is notified of the existence of an invalid subscriber identity in the mobile terminal. At block 86, user confirmation of a switch from the second communication network to the first communication network is received by mobile terminal 60. At block 88, operations are switched from the second communications network to the first communication network when it is determined that the subscriber identity of the mobile terminal is invalid.

For purposes of the description herein, the first communication network allows at least some types of access without a valid subscriber identity and the second communication network requires a valid subscriber identity for any type of access. However, it is to be understood that operations according to the present invention may be provided by preferably selecting the first communication network over the second communication network even where the second communication network may provide some limited form of access without a valid subscriber identity or where certain types of access are not allowed in the first communication network without a valid subscriber identity. According to the methods of the present invention, the first communication network is selected over the second communication network because the first communication network provides a greater level of access to a user without a valid subscriber identity, or because it operates with subscription data which is independent from the one used by the second network.

While in the embodiment of operations described with reference to FIG. 5, notification and confirmation of a switch are provided to and from the user, this is not required to obtain the benefits of the present invention. Alternatively, operations in switching communication network modes may be initiated automatically at block 88 responsive to a determination of an invalid ID at block 80. Furthermore, additional operations may be provided at block 88 to control user attempts to access a communication network for which there is no valid subscriber identity on mobile terminal 60. In such an embodiment, at block 88, after switching its communication network mode, mobile terminal 60 prevents user access to communication services on the second communication network which require a valid subscriber identity while the subscriber identity of the mobile terminal is determined to be invalid. Furthermore, any communications services of the first communication network which require a valid subscriber identity may also have their access blocked to the user of mobile terminal 60 while no valid subscriber identity is present in the mobile terminal.

A more detailed description of operations for a particular embodiment of the present invention will now be described with reference to FIG. 6. For purposes of the description of FIG. 6, the first communication network, i.e., the network allowing a higher level of service without a valid subscriber identity module, is a terrestrial communications network and the second communication network (lower level of service) is a satellite network. The flowchart of FIG. 6 begins operations with mobile terminal 60 being powered on in satellite mode. Operations according to the flowchart of FIG. 6 are intended to provide the best possible service to the user of a mobile terminal, i.e., at least limited service in terrestrial mode, in a secure and user-friendly way.

At power on, the mobile terminal 60 checks to see if a valid SIM card is present as shown at block 100. In mobile terminals utilizing SIM cards, this may be determined by checking for the physical presence of a valid SIM card. Where no valid SIM card is available, limited service available in terrestrial mode is provided higher priority than no service in satellite mode. For purposes of this description, it is assumed that the satellite communication network is a network such as the Asian Cellular Satellite System which provides no service without a valid subscriber identity.

If no SIM card is detected at block 100, operations move to block 102 and an indication is provided to the user of the mobile terminal of the absence of a valid subscriber identity. The user is also prompted at block 102 to switch to terrestrial mode. User communications may be performed via the mobile terminal user interface 70 and may involve the display of text or images, audio signals or other input output means.

Upon receipt of user confirmation of the suggested switch to terrestrial mode at block 102, the mobile terminal disregards any pre-stored information that prioritizes or restricts the use of the terrestrial system at block 104 and attempts to establish a communication link over a terrestrial channel to allow emergency calls to be initiated by the user. Alternatively, block 102 and waiting for user confirmation at block 104 may be bypassed and mobile terminal 60 may automatically initiate switching to the terrestrial mode of operation.

If a valid SIM card is detected on power up at block 100, mobile terminal 60 continues in satellite mode operations at block 106. However, mobile terminal 60 checks for a valid SIM at various times other than power on. If during such a periodic check, mobile terminal 60 determines that a valid subscriber identity is no longer available because the SIM card has been removed, as at block 108, operations move to block 102 to initiate transition to terrestrial mode operations. In addition, as illustrated at block 110, an invalid subscriber identity may be noted during satellite mode operations during non-emergency network access due to, for example, subscriber or mobile equipment identity verification failure responsive to service requests, location updates or authentication checks or the like. Possible network related causes for loss of a valid subscriber identity without removal of the card would include illegal operations. If SIM invalidation during non-emergency network access is identified at block 110, operations again move to block 102 to transition to terrestrial mode operations.

Finally, an emergency call request from the user during satellite mode operations, as illustrated at block 112, initiates a check for the presence of a valid subscriber identity at block 114. If a valid subscriber identity is detected at block 114, the emergency call is processed in satellite mode as illustrated at block 116. At block 118, the emergency call is processed in terrestrial mode if the SIM is determined to be invalid at block 114.

Figures 6, 6A:
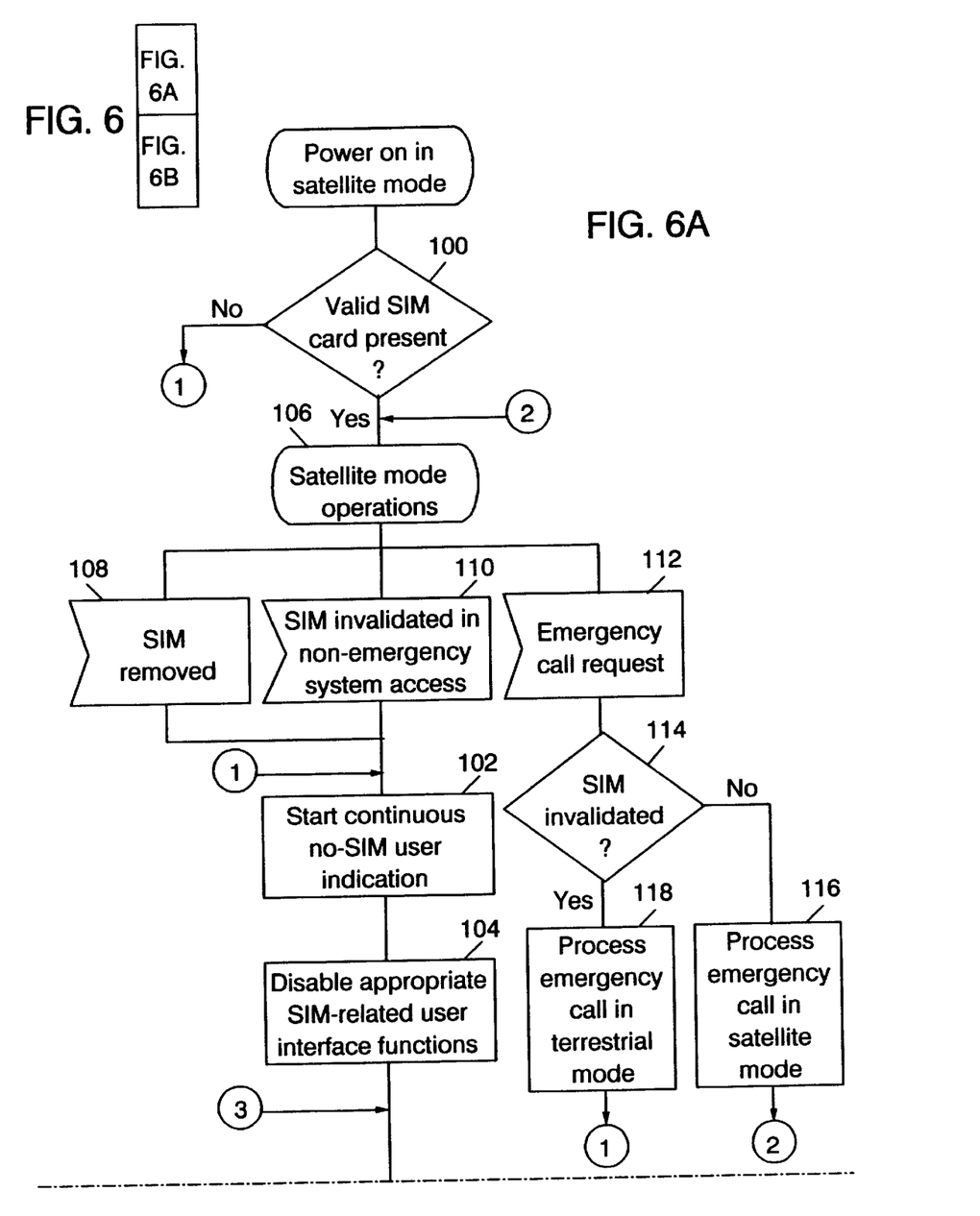
FIG. 6 is a flowchart illustrating operations for a further embodiment of the present invention.
Figure 6B:
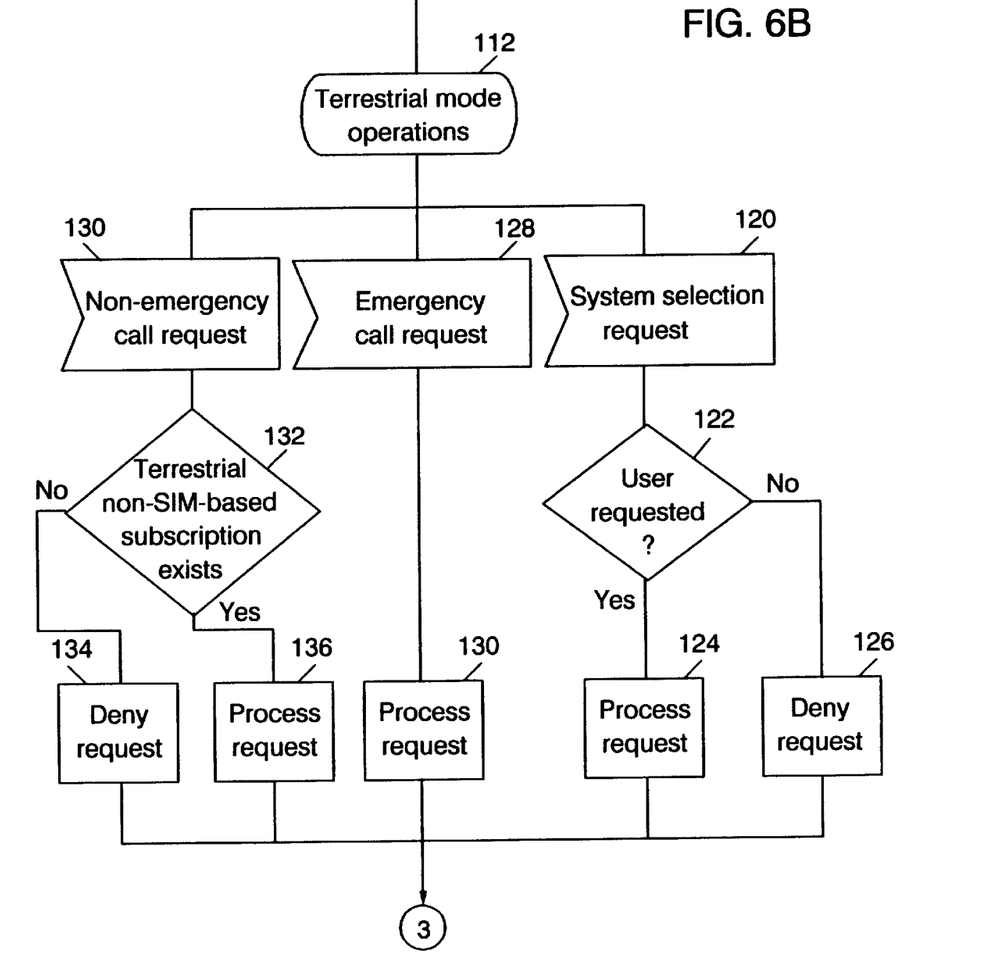

As illustrated in the embodiment of FIG. 6, emergency calls may be immediately processed in terrestrial mode without awaiting confirmation of a switch from the user. This is a preferred method of operation as it provides the fastest possible access to the terrestrial mode network for placement of the emergency call. However, operations at block 118 may provide a notification to the user that no valid subscriber identity is present and request user confirmation of a switch to terrestrial mode before placing the emergency call.

At block 120, mobile terminal 60 has successfully switched from satellite to terrestrial mode operations. While operating in terrestrial mode without a valid subscriber identity, the mobile terminal disregards any pre-stored information which controls the use of satellite mode versus terrestrial mode. The mobile terminal preferably does not try to transfer to satellite mode of operations as a result of any event in idle mode terrestrial operations which would normally cause a transfer such as an operator initiated reselection. However, mobile terminal user operations are provided as will now be described.

As illustrated at blocks 120 and 122, when a network mode selection request is received by mobile terminal 60 requesting transfer to satellite mode, the request is checked at block 122 to determine if it was mobile terminal user initiated. If so, the request is processed at block 124 and mobile terminal 60 attempts to re-establish satellite mode operations. However, if the request is not from a user of the mobile terminal at block 122, the request is denied at block 126 and operations continue in terrestrial mode.

While not illustrated in FIG. 6, if the SIM card is replaced and a valid subscriber identity is present, the mobile terminal resumes normal operations including utilization of any pre-stored system priority or restriction information and the mobile terminal may switch back to satellite mode of operations pursuant to such system priority information. Furthermore, while in terrestrial mode operations as a result of a lack of a valid subscriber identity, user interface functionality of the mobile terminal is preferably limited in areas which require interaction with a subscriber identity for execution. User services, menus and selection operations which require SIM card support may accordingly be disabled by mobile terminal 60. The disabling may be achieved by making the corresponding parts of the user interface unavailable to the user such as by not presenting these parts on the display or by marking them in a way that distinguishes them from available user functionality. Mobile terminal 60 may then ignore related user actions requesting unavailable services. As noted in the discussion of block 102, a continuous indication of an invalid subscriber identity is provided to a user throughout terrestrial mode operations.

During terrestrial mode operations, if an emergency call request is received from a user as indicated at block 128, the request is process at block 130 and the emergency call is placed over the terrestrial network.

Where the terrestrial network allows user access beyond emergency calls without a valid subscriber identity, non-emergency call requests may be processed as indicated at block 130–136. These operations provide for intermediate levels of access to a user in network environments where communication network interworking does not invalidate at least one part of the system-dependent subscription if another part is invalidated. An example of such an application is a multi-mode phone for the Asian Cellular Satellite System with AMPS as a terrestrial mode service. This would also apply to terrestrial based digital dual-mode phones accessing a digital GSM network and the analog AMPS network where additional services are provided beyond emergency calling on the AMPS network. In such a case, terrestrial mode shall be understood to refer to AMPS mode or other service providing user access beyond emergency calling without a valid non-AMPS mode subscriber identity.

Referring again to FIG. 6, after a non-emergency call request is received in terrestrial mode at block 130, mobile terminal 60 determines whether non-Subscriber Identity Module based subscription access exists in terrestrial mode at block 132. If such access exists, in other words, if it is determined that non-emergency access is available at block 132, the call request is processed in terrestrial mode at block 136. However, if no non-emergency access is available at block 132, the request is denied as indicated at block 134.

While the present invention has been described above with respect to switching between two networks, as will be appreciated by those of skill in the art, the present invention may be utilized with greater numbers of networks. In such a case, a hierarchy of network selection may be established so as to provide the highest level of access available based upon the available networks. Furthermore, this hierarchy may be dynamically determined by processor 60 based on the available networks.

As described above, the multi-mode mobile terminal and methods of operating the same of the present invention provide for mobile terminal operations at the highest available level of service in complicated multi-mode phone system environments where different communication networks support different levels of mobile terminal access without a subscriber identity. This capability is provided in a safe and user-friendly manner which is especially advantageous in emergency call situations. The described operations are typically expected to be reliable and comply with existing technical specification requirements for presently known terrestrial and satellite networks. The apparatus and methods of the present invention may also be readily implemented and applied to mobile terminal equipment using a variety of subscriber identity configurations.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A multi-mode mobile terminal having a subscriber identity, comprising:
    transceiver means for communicating over a first and a second wireless communication network;
    means for determining if the first network allows access without a valid subscriber identity;
    means for determining if the second network allows access without a valid subscriber identity;
    means for determining if the subscriber identity is valid for the first network;
    means for determining if the subscriber identity is valid for the second network;
    means responsive to the means for determining if the first network allows access and the means for determining if the second network allows access for controlling the transceiver means so as to communicate over a selected one of the first or the second network which allows access without a valid subscriber identity if the subscriber identity of the mobile terminal is invalid in both the first network and the second network.

2. The mobile terminal of claim 1 further comprising:
    display means for notifying a user that the subscriber identity is invalid;
    input means for receiving input from the user specifying one of said first or second networks to use for communications; and
    wherein said means for controlling comprises means for controlling the transceiver means so as to communicate over a user specified one of said first or second networks.

3. The mobile terminal of claim 1 wherein said first network is a satellite network and said second network is a terrestrial network.

4. The mobile terminal of claim 3 wherein said satellite network is an Asian Cellular Satellite System.

5. The mobile terminal of claim 1 wherein said first network is a digital network and said second network is an AMPS network allowing access without a valid subscriber identity.

6. The mobile terminal of claim 5 wherein said digital network is an Asian Cellular Satellite System.

7. The mobile terminal of claim 5 wherein said digital network is a terrestrial network allowing only emergency call access without a valid subscriber identity.

8. The mobile terminal of claim 7 wherein said means for controlling comprises means for controlling the transceiver means so as to communicate over said AMPS network so as to provide the mobile terminal the broadest communications service available without a valid subscriber identity.

9. The mobile terminal of claim 1 further comprising a subscriber identity module containing the subscriber identity of the mobile terminal for at least one of the first network and the second network.

10. The mobile terminal of claim 9 further comprising storage means containing a definition of communications services available from the first and the second network without a valid subscriber identity.

11. The mobile terminal of claim 1 further comprising means for preventing operation of the transceiver means for communicating over one of the first network or the second network which does not allow access without a valid subscriber identity unless the mobile terminal has a valid subscriber identity for the one of the first network or the second network which does not allow access without a valid subscriber identity.

12. The mobile terminal of claim 1 further comprising means for preventing user access to communications services requiring a valid subscriber identity when the mobile terminal is communicating without a valid subscriber identity.

13. A method for dual-mode operations of a mobile terminal in a first communication network which allows a first level of access without a valid subscriber identity and a second communication network which allows a second level of access lower than the first level of access without a valid subscriber identity, the mobile terminal having a subscriber identity, the method comprising the steps of:
    determining the first level of access and the second level of access;
    determining if the subscriber identity of the mobile terminal is valid; and
    automatically selecting operations in the first communication network when the subscriber identity is determined to be invalid for the second communication network.

14. The method of claim 13 wherein said automatically selecting step comprises the steps of:
    overriding pre-stored network selection criteria while the subscriber identity is determined to be invalid; and
    switching operations from the second communication network to the first communication network automatically based on the determined first level and second level when the subscriber identity of the mobile terminal is invalid.

15. The method of claim 13 wherein the step of determining if the subscriber identity of the mobile terminal is valid is initiated responsive to a user initiating operations in at least one of the first communication network or the second communication network.

16. The method of claim 13 wherein the step of determining if the subscriber identity of the mobile terminal is valid is initiated as part of a system access attempt initiated by at least one of a user or the mobile terminal.

17. The method of claim 13 wherein the step of determining if the subscriber identity of the mobile terminal is valid is initiated responsive to a user initiated emergency call.

18. The method of claim 13 further comprising the step of overriding pre-stored network selection criteria while the subscriber identity is determined to be invalid.

19. The method of claim 13 further comprising the step of preventing user access to communications services requiring a valid subscriber identity while the subscriber identity is determined to be invalid.

20. A multi-mode mobile terminal having a subscriber identity, comprising:

a transceiver configured to communicate over a first and a second wireless communication network;

a memory containing an indication of whether at least one of the first network and the second network allow access without a valid subscriber identity;

a detection circuit that determines if the subscriber identity is valid for at least one of the first network and the second network;

a controller operatively coupled to the memory and responsive to the detection circuit that controls the transceiver to communicate over a selected one of the first or the second network which allows access without a valid subscriber identity if the subscriber identity of the mobile terminal is invalid in both the first network and the second network.

* * * * *